United States Patent [19]

Patel et al.

[11] Patent Number: 5,513,879
[45] Date of Patent: May 7, 1996

[54] TWO STAGE INFLATOR WITH MODULE VENTING FOR PASSENGER SIDE AIRBAGS

[75] Inventors: Jitendrea Patel, Cedar Knolls; Allen Breed, Boonton Township; Torbjorn Thuen, Morris Plains, all of N.J.; Russel Brantman, New City, N.Y.

[73] Assignee: Breed Automotive Technology, Inc., Lakeland, Fla.

[21] Appl. No.: 237,623

[22] Filed: May 4, 1994

[51] Int. Cl.$^6$ .......................... B60R 21/28; B60R 21/26
[52] U.S. Cl. .......................... 280/739; 280/736; 280/742
[58] Field of Search ..................... 280/739, 738, 280/736, 742, 728 A, 728 R, 732, 741, 740, 728.2, 728.1

[56] References Cited

U.S. PATENT DOCUMENTS

| | | | |
|---|---|---|---|
| 3,758,133 | 9/1973 | Okada | 280/739 |
| 3,801,127 | 4/1974 | Katter et al. | 280/738 |
| 3,810,523 | 5/1974 | Yamaguchi et al. | 280/739 |
| 3,874,693 | 4/1975 | Patzelt et al. | |
| 3,910,595 | 10/1975 | Katter et al. | 280/732 |
| 3,938,826 | 2/1976 | Giorgini et al. | 280/738 |
| 4,394,033 | 7/1983 | Goetz et al. | 280/736 |
| 4,696,705 | 9/1987 | Hamilton | 149/21 |
| 4,698,107 | 10/1987 | Goetz et al. | 149/7 |
| 4,796,912 | 1/1989 | Lauritzen et al. | 280/736 |
| 4,817,828 | 4/1989 | Goetz | 280/736 |
| 4,842,300 | 6/1989 | Ziomek et al. | 280/732 |
| 4,919,897 | 4/1990 | Bender et al. | 280/736 |
| 4,950,458 | 8/1990 | Cunningham | 280/741 |
| 4,998,751 | 3/1991 | Paxton et al. | 280/741 |
| 5,000,479 | 3/1991 | Werner et al. | 280/736 |
| 5,033,390 | 7/1991 | Minert et al. | 280/741 |
| 5,100,172 | 3/1992 | Van Voorhies et al. | 280/739 |
| 5,129,674 | 7/1992 | Levosiniki | 280/738 |
| 5,135,255 | 8/1992 | Henseler et al. | 280/731 |
| 5,172,933 | 12/1992 | Strasser | 280/740 |
| 5,195,775 | 3/1993 | Komerska et al. | 280/732 |
| 5,226,670 | 7/1993 | Wright et al. | 280/738 |

FOREIGN PATENT DOCUMENTS

| | | | |
|---|---|---|---|
| 0382552 | 8/1990 | European Pat. Off. | 280/736 |
| 4005768 | 8/1991 | Germany | 280/736 |
| 0032957 | 2/1991 | Japan | 280/739 |
| 0092451 | 4/1991 | Japan | 280/736 |
| 4345555 | 12/1992 | Japan | 280/736 |
| 5319199 | 12/1993 | Japan | 280/736 |

Primary Examiner—Karin L. Tyson
Assistant Examiner—Peter C. English
Attorney, Agent, or Firm—Kane, Dalsimer, Sullivan, Kurucz, Levy, Eisele and Richard

[57] ABSTRACT

A passive two stage passenger side inflator is disposed in a module funnel coupled to an airbag. The two stage inflator provides a gentle onset during the initial deployment to help protect out-of-position passengers. The second rapid stage is ignited passively by hot gas communication from the first stage. The inflating gases from both stages flow through a module funnel into the airbag. Openings in the module funnel permit pressure relief venting of the airbag to further protect out-of-position passengers even if the bag has not yet unfolded. Preferably the module is mounted such that the funnel vent openings direct the vented gas into the instrument panel, thus minimizing the particulate released into the passenger compartment.

19 Claims, 2 Drawing Sheets

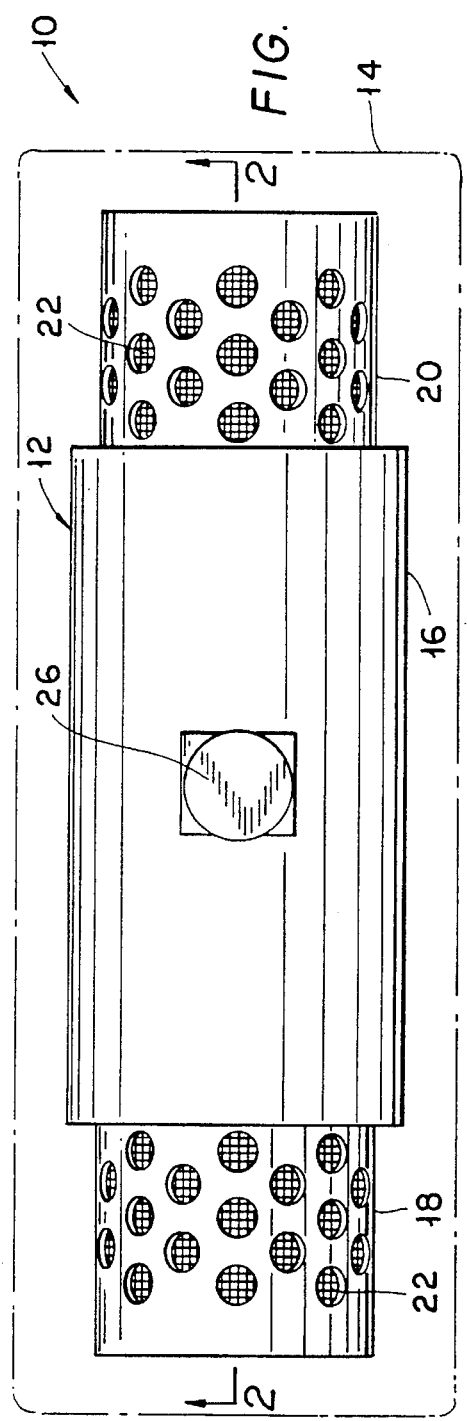
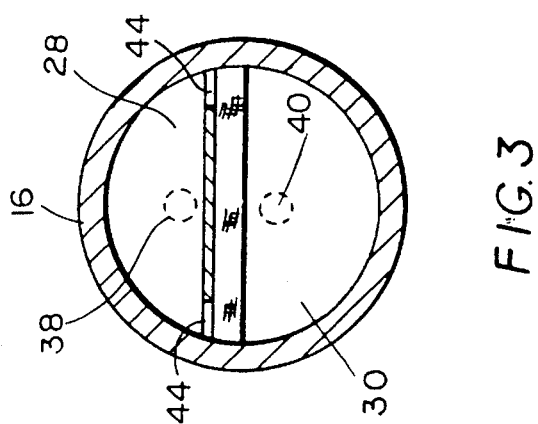
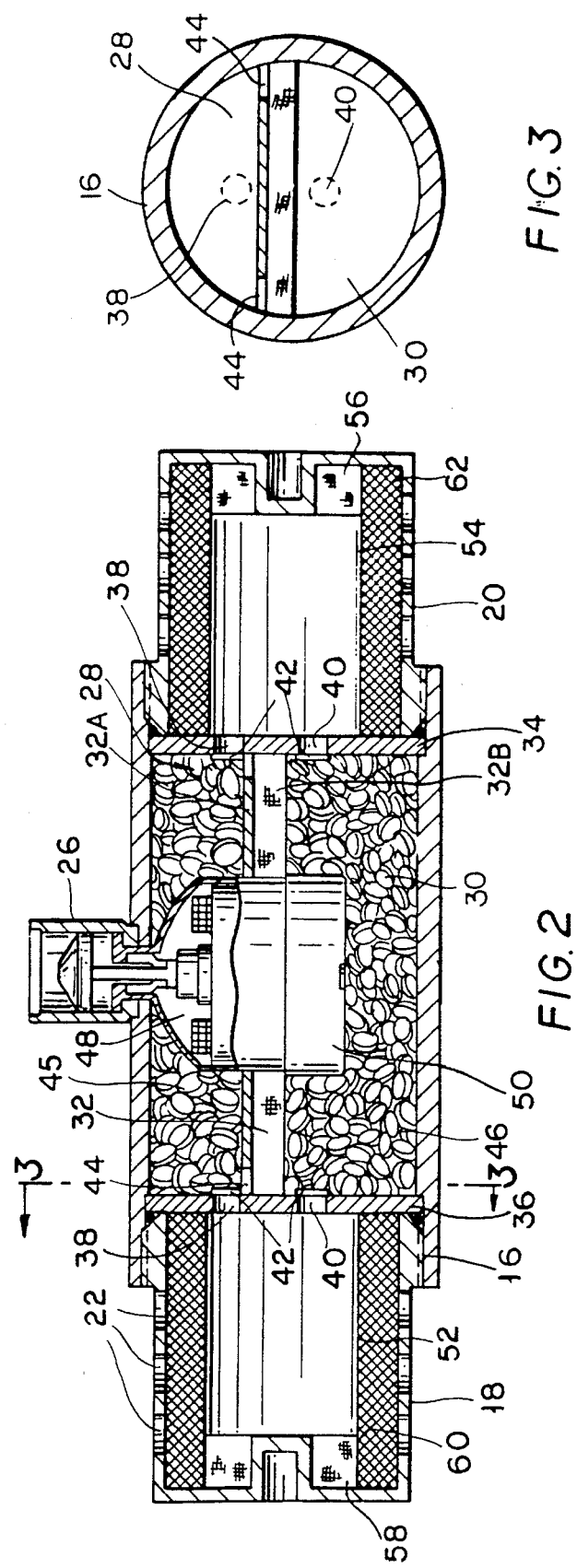

5,513,879

TWO STAGE INFLATOR WITH MODULE VENTING FOR PASSENGER SIDE AIRBAGS

BACKGROUND OF THE INVENTION

1. Field of Invention

This invention relates to airbag inflators, and more particularly to an airbag inflator and module suitable for rapidly inflating a passenger side airbag while mitigating injury to an out-of-position occupant located close to the instrument panel at the time of airbag deployment, and for minimizing the particulate released into the passenger compartment from the venting gases.

2. Description of the Prior Art

Until now the major effort in airbag system design has been toward airbags for the driver side of the motor vehicle. These systems typically include three elements: an accelerometer sensor for sensing the acceleration of a motor vehicle, an inflator responsive to the acceleration sensor and which generates an inflating gas, and an inflatable bag coupled to the inflator with vent holes in the bag. The inflators of these types of systems are single stage inflators which generate a large volume of gas in a very short time. Venting of the gas is accomplished by vent holes in the bag which become effective only after the airbag has completely unfolded. These systems are well suited for the driver side because the position of the driver is known and therefore the bag can be shaped and positioned so that it inflates quickly during the crash to protect the driver without injuring him. Single stage inflators are also well suited for the passenger side on relatively large cars having a soft body. However these types of inflators are too slow for small cars having a stiff body wherein the deceleration propagates to the passenger compartment faster than in a large car. Moreover if a single stage inflator is speeded up, it deploys the airbag out too quickly so that it may injure the passenger especially if the passenger is out of position. In addition, venting through the airbag does not provide pressure relief for an out-of-position passenger close to the instrument panel.

OBJECTIVES AND SUMMARY OF THE INVENTION

In view of the above-mentioned disadvantages of the prior art, it is an objective of the present invention to provide a two stage inflator suitable for smaller, more rigid cars.

A further objective is to provide an inflator which provides a passive graduate inflation to provide protection to an out-of-position passenger.

Yet a further objective is to provide an inflator system with venting built into the inflator module funnel rather than the bag to provide early pressure relief venting for an out-of-position passenger close to the instrument panel.

An additional objective is to vent the gases and suspended particulate matter into the instrument panel, thereby minimizing the amount of particulate released into the passenger compartment.

Other objectives and advantages of the invention shall become apparent from the following description.

Briefly, an inflator system constructed in accordance with this invention includes a passive two stage inflator acting as a source of inflating gas, a module funnel for channeling the gas and for mounting the inflator in a motor vehicle, and an airbag coupled to the module funnel for receiving the inflating gas. The module funnel also includes venting openings for venting the airbag preferably into the instrument panel. Baffle means are also provided for separating the inflating gas from the vented gas.

BRIEF DESCRIPTION OF THE DRAWINGS

FIG. 1 shows a back view of a two-stage inflator constructed in accordance with this invention;

FIG. 2 shows a plan sectional view of the inflator of FIG. 1 taken along lines 2—2;

FIG. 3 shows a side sectional view of the inflator of FIG. 1 taken along line 3—3;

DETAILED DESCRIPTION OF THE INVENTION

Figure 4:
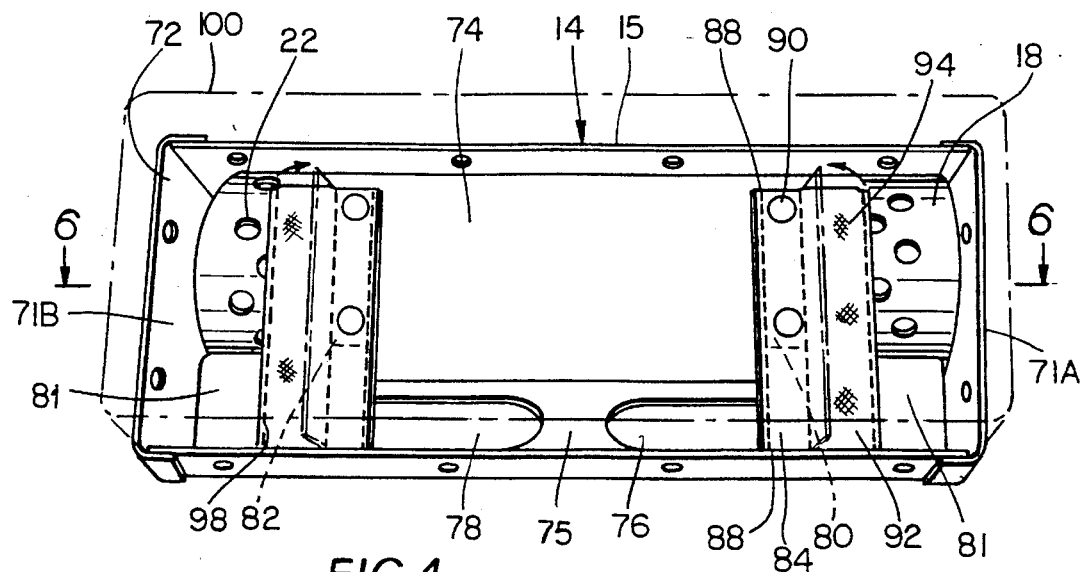
FIG. 4 shows a front view of the inflator module funnel holding the inflator of FIGS. 1–3.

As shown in FIG. 1, the inflator system 10 constructed in accordance with this invention consists of an inflator 12 mounted to an inflator module funnel 14. Inflator 12 includes a central portion 16 having a substantially tubular shape. Extending axially outwardly of portion 16 are two tubular extensions 18, 20, each being provided with perforations 22. A tube 26 is secured on the portion 16 as shown.

As seen in more detail in FIG. 2, central portion 16 is partitioned into two semi-cylindrical chambers 28, 30 by a wall 32. Wall 32 includes an insulation layer 32A and a slag filter 32B. Chambers 28, 30 are separated from the extensions 18, 22 by respective choke plates 34, 36. Each of these choke plates are provided with holes 38, 40 from each of the chambers 28, 30, which holes are covered by burst foils such as 42. Openings or slots 44 provide communication between the chambers 28, 30 through the insulation layer 32A. Chamber 28 is filled with relatively large gas generating capsules 45 generating a gas at a relatively slow rate. Chamber 30 is filled with a larger number of smaller capsules 46 generating gas at a much faster rate than capsules 45. Tube 26 is connected to a chamber 48 formed inside housing 16 and holding an accelerator sensor 50. Sensor 50 may be either a mechanical sensor which incorporates a charge for setting an enhancer off pyrotechnically, or it may be an electric squib.

Extensions 18, 22 each have a respective internal cylindrical wall 52, 54 which channel gases from the central portion 16 to respective annular slag filters 56, 58. Two annular fine filters 60, 62 substantially coextensive with the axes of extensions 18, 20 respectively are used to filter out the fine particulate material from the gases prior to their exit through holes 22.

As previously mentioned, inflator 12 is mounted to a module funnel 14. As shown in more detail in FIGS. 4–6, module funnel 14 has a support housing 15 formed of a rounded back wall 70, two end walls 71A, 71B and a bottom wall 75. These walls define a generally rectangular collar 72 with a front opening 74. Bottom wall 75 extends forward tangentially from backwall 70, as seen in FIG. 5 and is formed with two oblong openings 76, 78 extending in parallel to the longitudinal axis of inflator 12.

Module funnel 14 is also provided with two vertical rigid brackets 80, 82 made from the same material as the rest of module such as for example sheet steel or aluminum. Bracket 80 consists of two portions: a lower portion 81 and an upper portion 83 seen in FIG. 5. Lower portion 81 is generally L-shaped and has two legs 85, 87 secured to bottom wall 75. Upper portion 83 has a C-shaped wall 89 extending in parallel with the end wall 71A and shaped to embrace and secure tubular extension 18 of inflator 12. Wall 89 is also perpendicular and attached to leg 87. Upper part 83 also has another wall 91 extending in perpendicular to wall 89 and extending in parallel to opening 74. Bracket 82 is the mirror image of bracket 80.

Figure 6:
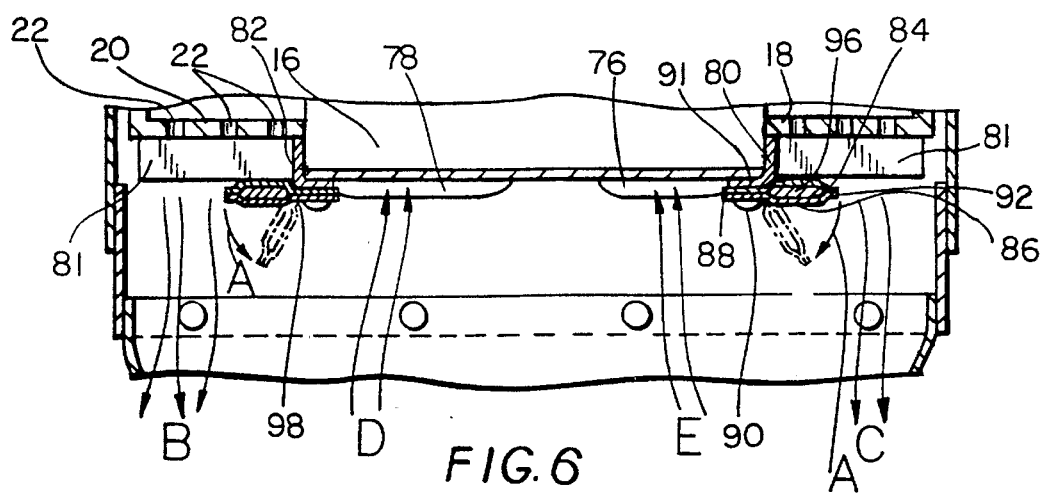
FIG. 6 shows a partial top-sectional view of the module funnel of FIGS. 4 and 5.

Mounted on bracket 80 there is a baffle 84. As best seen in FIG. 6, baffle 84 is formed of two layers of fabric 86 with a metal 96 insert for rigidity. Preferably fabric 86 is made of the same fabric as the air bag so that it is heat resistant. Baffle 84 is partitioned into two portions. One portion 88 is rigidly mounted on wall 91 of bracket 80 by securing means 90 as shown in FIG. 4. The other portion 92 forms a baffle flapper free to pivot to position with respect to portion 88, as shown in FIG. 6 by arrow A. Bracket 82 has a similar baffle 98. Openings 76 and 78 extend between the baffles 84, 98.

Figure 5:
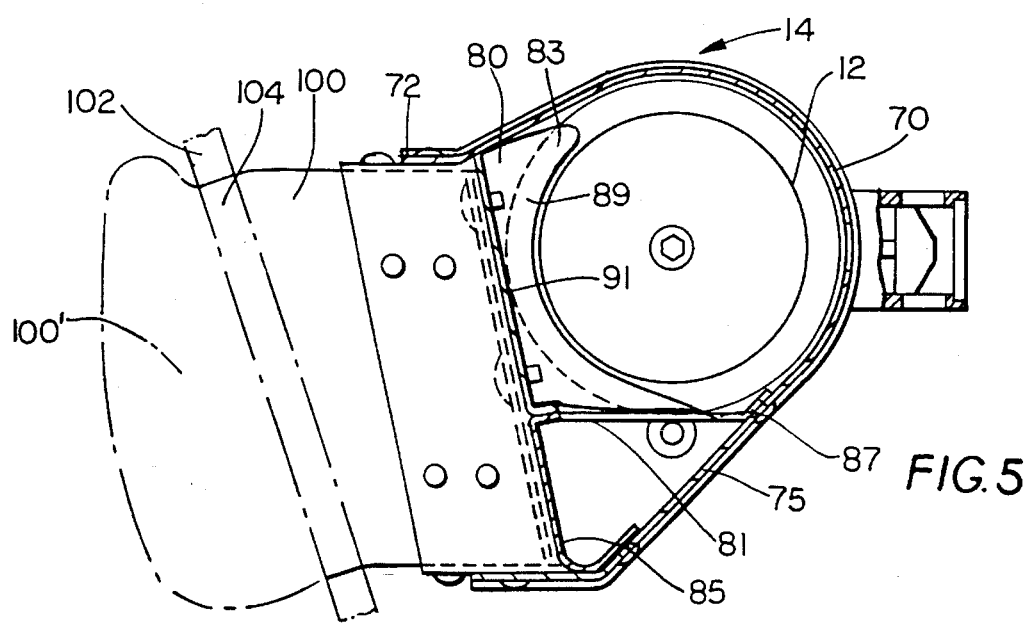
FIG. 5 shows a side view of the module funnel of FIG. 4 with the end wall removed.

Collar 72 is shaped and sized to hold a packed airbag 100 shown in FIG. 5. The airbag 100 fits into collar 72. The baffles are normally biased by their fabric to a flat configuration shown in solid lines in FIGS. 4 and 6 so that they do not interfere with airbag 100.

The inflator system 10 is normally installed in the instrument panel 102 (FIG. 5) with the airbag pack 100 facing a passenger and disposed behind a breakaway member 104. Sensor 50 is then armed through tube 26. When an abnormal deceleration is detected by sensor 50, it sets off the slow capsules 45. The gas generated by these capsules creates a positive pressure in chamber 28 which breaks the foils 42 covering holes 38 allowing the gas from chamber 28 to flow axially through extensions 18, 20 through slag filters 56, 58, fine filters 60, 62 and finally through exit holes 22.

Once outside the inflator, the gas is funneled by the funnel module housing and more particularly the back wall 70, bottom wall 75 and the horizontal leg 87 of bracket bottom portion 81, toward the opening 74 thereby forcing the airbag 100 to open as to 100' (FIG. 5). As the gas flows through the opening 74, as indicated by arrows B and C in FIG. 6 it forces the baffles 84, 98 to pivot forward in the direction of arrow A. Baffles 84, 98 and brackets 80, 82 insure that in this initial stage the gas does not flow out through openings 76, 78.

Initially, the heat generated in chamber 28 is restricted therein by insulator wall 32A to insure that the capsules 46 are not set off prematurely. Once the capsules 45 are set off, some of the gas produced in chamber 28 flows through the openings 44 and slag filter 32B into chamber 30 so that eventually the capsules 46 are set off also. Thus, the second rapid stage is ignited passively, in a controlled fashion, by hot gas communication from the first stage. The gas generated by these latter capsules bursts foils 42 covering holes 40 and exit quickly from the inflator to further inflate the airbag 100'. As the airbag 100' is expanding toward the passenger, if an overpressure condition is encountered such as an out-of-position passenger the gases can escape through the funnel vent openings 76, 78 as indicated by arrows D and E and provide effective pressure relief. In addition, the vented gases at all times flow into the instrument panel and not in the passenger compartment. Therefore particulate matter in the vented gases is kept to a minimum in the passenger compartment.

In this manner a passive two stage inflator is provided which inflates the airbag first at a slow rate to mitigate injuries to an out-of-position passenger, and then a fast rate to complete the formation of the airbag. To further mitigate injuries to a passenger close to the instrument pane, pressure relief venting will take place through the openings 76, 78 in the module funnel even if the bag has not yet unfolded. Moreover, during normal deployment, because the vented gases exit into the instrument panel, the passengers are protected from particulate matter formed during the gas generation.

Obviously numerous modifications may be made to the invention without departing from its scope as defined in the appended claims.

We claim:

1. An airbag system comprising:

an inflator for producing an inflating gas, said inflator including a central portion and first and second portions extending axially outwardly from said central portion, said first and second portions each having a plurality of openings for releasing said inflating gas produced from said inflator;

said inflator passively generating said inflating gas in two stages;

support means for supporting said inflator in a motor vehicle;

an airbag coupled to said support means for receiving said inflating gas, said support means includes venting means between said first and second portions for venting vented gas from said airbag and means for separating said inflating gas from said vented gas.

2. The system of claim 1 wherein said support means further includes a housing and means disposed in said housing for funneling said inflating gas to said airbag.

3. The system of claim 1 wherein said inflator includes a tubular inflator housing with said plurality of openings disposed peripherally about said inflator housing.

4. The system of claim 3 wherein said separating means includes channel means for channeling said inflating gas from said openings to said airbag.

5. The system of claim 4 wherein said channel means includes a baffle having a flapper portion pivotable between a first position and a second position.

6. The system of claim 5 wherein said flapper portion in said second position is arranged to separate said inflating gas from said vented gas.

7. The system of claim 1 wherein said inflator includes an inflator housing having a first and a second chamber, said first and second chambers containing first and second gas generating materials, respectively.

8. The system of claim 7 wherein said first material releases inflating gas at a slower rate than said second material.

9. The system of claim 8 wherein said inflator further includes an insulator wall between said chambers for restricting heat generated in said first chamber from exposure to said second material.

10. The system of claim 8 wherein said inflator further includes only an initiator for initiating said first material in response to a deceleration.

11. The system of claim 1 wherein opening means are provided between the stages for igniting the second stage passively by hot gas communication from the first stage.

12. The system of claim 1 wherein the venting means provides pressure relief even if the airbag has not yet unfolded.

13. The system of claim 1 wherein said support means further includes funnel means for venting vented gas into the instrument panel of a vehicle to minimize the particulate released into the passenger compartment.

14. An airbag system comprising:

an inflator for producing an inflating gas, said inflator including a central portion and first and second portions extending axially outwardly from said central portion, said first and second portions each having a plurality of openings for releasing said inflating gas produced from said inflator, said inflator passively generating said inflating gas in two stages;

support means for supporting said inflator in a motor vehicle;

an airbag coupled to said support means for receiving said inflating gas, said support means includes venting means between said first and second portions for venting vented gas from said airbag; and means for directing said inflating gas from said inflator into said airbag.

15. The system of claim 14 wherein said means for directing includes means for separating said inflating gas leaving said inflator from said gas being vented through said venting means.

16. A two stage airbag system comprising:

inflator means for passively generating inflating gas in two stages, said inflator means having a central portion, first and second portions extending axially outwardly from said central portion, a first chamber and a second chamber below said first chamber, said chambers positioned between said first and second portions, said first and second portions each including a plurality of openings to release said inflating gas;

support means for supporting said inflator means, said support means including a vent opening;

an airbag coupled to said support means for receiving said inflating gas, said airbag being positioned to vent a vented gas through said vent opening in the support means, said support means further includes means for separating said inflating gas from said gas vented from said airbag through said vent opening.

17. The system of claim 16 wherein the first and second chambers contain first and second gas generating materials, respectively.

18. The system of claim 17 wherein the first material releases inflating gas at a slower rate than said second material.

19. The system of claim 18 wherein said inflator means further includes an insulator wall between said chamber for restricting heat generated in said first chamber from exposure to said second material.

* * * * *